United States Patent [19]

Kinasi et al.

[11] Patent Number: 5,177,689
[45] Date of Patent: Jan. 5, 1993

[54] CAD/CAM APPARATUS FOR ENHANCING OPERATOR ENTRY OF MACHINING ATTRIBUTES AND GEOMETRIC SHAPES

[75] Inventors: Katuhiko Kinasi; Ken Arao; Tetsu Itaba, all of Aichi, Japan

[73] Assignee: Mitsubishi Denki K.K., Tokyo, Japan

[21] Appl. No.: 492,156

[22] Filed: Mar. 13, 1990

[30] Foreign Application Priority Data

May 8, 1989 [JP] Japan .................................. 1-114647

[51] Int. Cl.$^5$ ............................................. G06F 15/46
[52] U.S. Cl. ........................ 364/474.26; 364/474.27; 364/474.24; 364/191; 364/474.04
[58] Field of Search ............... 364/188, 189, 191, 192, 364/474.22, 474.24, 474.25, 474.26, 474.27, 474.04

[56] References Cited

U.S. PATENT DOCUMENTS

| | | | |
|---|---|---|---|
| 4,490,781 | 12/1984 | Kishi et al. | 364/474.25 |
| 4,700,314 | 10/1987 | Kinoshita | 364/474.04 |
| 4,703,146 | 10/1987 | Kinoshita | 364/474.04 |
| 4,723,203 | 2/1988 | Kishi et al. | 364/474.26 |
| 4,802,083 | 1/1989 | Isobe et al. | 364/474.26 |
| 4,901,220 | 2/1990 | Matsumura | 364/474.26 |
| 4,904,914 | 2/1990 | Seki et al. | 364/474.25 |
| 4,926,311 | 5/1990 | Matsumura | 364/474.27 |
| 4,949,270 | 8/1990 | Shima et al. | 364/474.27 |
| 5,006,977 | 4/1991 | Seki et al. | 364/474.26 |
| 5,051,912 | 9/1991 | Johanson et al. | 364/474.04 |

Primary Examiner—Jerry Smith
Assistant Examiner—Jim Trammell
Attorney, Agent, or Firm—Sughrue, Mion, Zinn, Macpeak & Seas

[57] ABSTRACT

A series of input units (a machining attribute specification unit, a geometric element selection unit, and an additional information input unit) of a CAD/CAM apparatus according to the present invention enables machining attributes to be input in an interactive manner while such data are displayed on a display, simplifying input procedures of various items of machining attribute information, and enables the input various item information to be displayed on the display, making confirmation of the input information easy by virtue of the simplified inputting and by the visual confirmation.

10 Claims, 10 Drawing Sheets

CAD/CAM APPARATUS FOR ENHANCING OPERATOR ENTRY OF MACHINING ATTRIBUTES AND GEOMETRIC SHAPES

BACKGROUND OF THE INVENTION

1. Field of the Invention

The present invention relates to a CAD/CAM apparatus for inputting a machining shape and machining attributes in an interactive manner on a display device, and for producing NC data for a wire cut electrical discharge machine.

2. Description of the Prior Art

Figure 1:
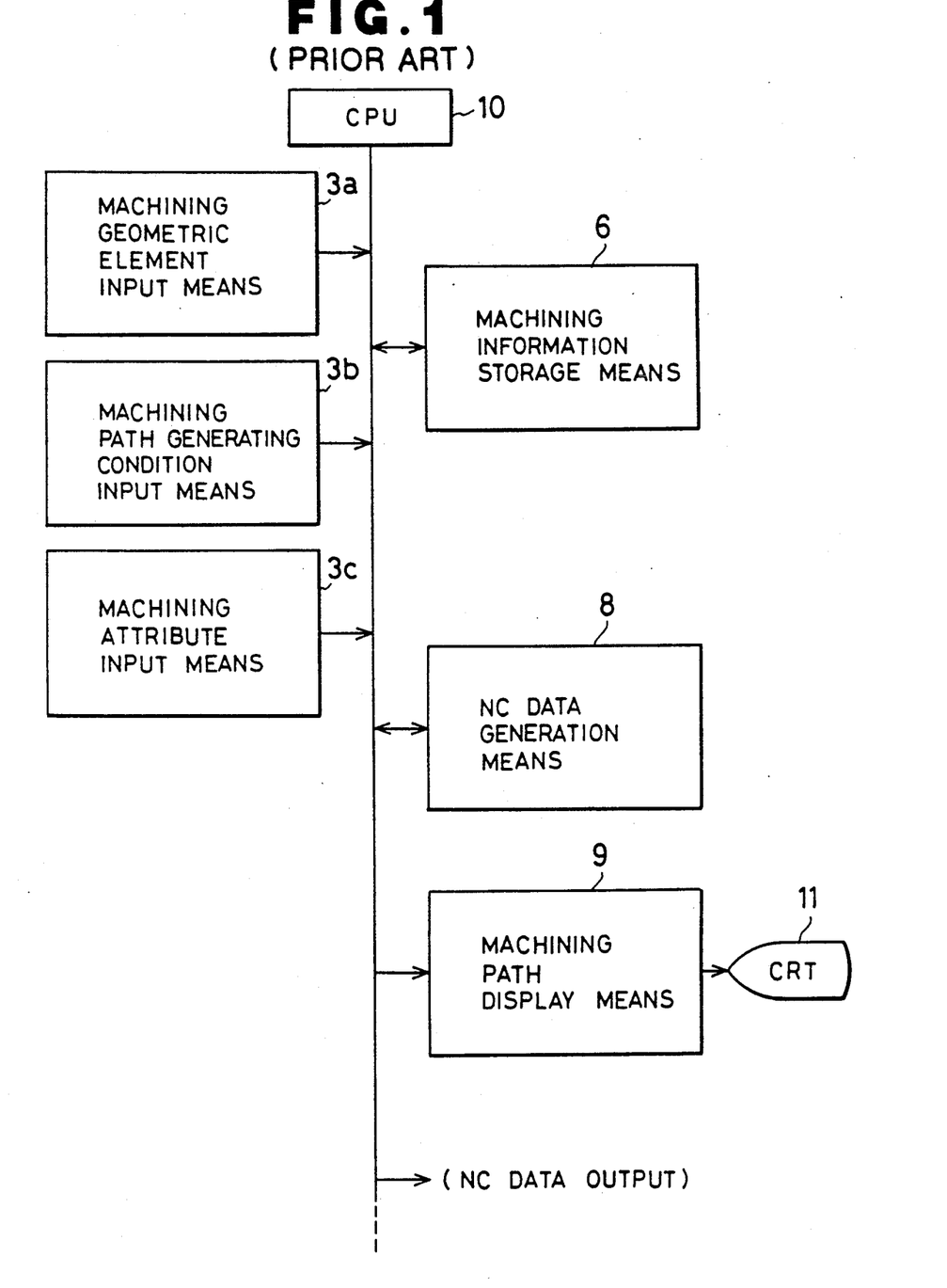
FIG. 1 is a block diagram of a prior art apparatus.

FIG. 1 is a block diagram of a prior art apparatus for producting NC data. Referring to the figure, reference numberal 3a denotes a machining geometric input means for defining elements of a geometric shape to be machined, 3b denotes a machining path generating condition input means for defining the movement of a wire along the defined geometric elements, 3c denotes a machining attribute input means for providing attributes for machining to some geometric elements, 6 denotes a machining information storage means for storing various items of input information, 8 denotes an NC data generation means for analyzing various items of input information to thereby generate NC data, 9 denotes a machining path display means for translating a machining path into a graphic form and displaying it on a display, 10 denotes a CPU, and 11 denotes the display.

Figure 2:
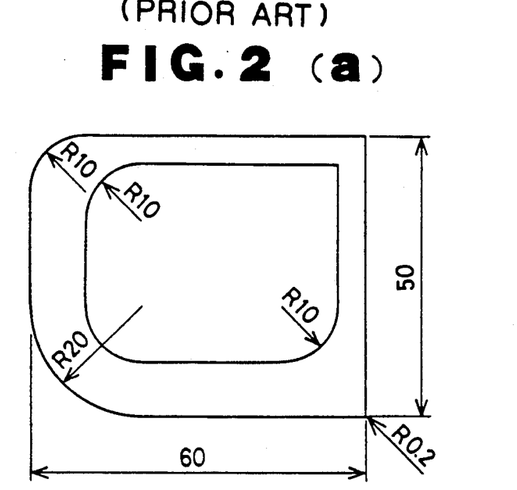
FIG. 2(a) to FIG. 2(c) are three-view projections showing an example of machining.
Figure 3:
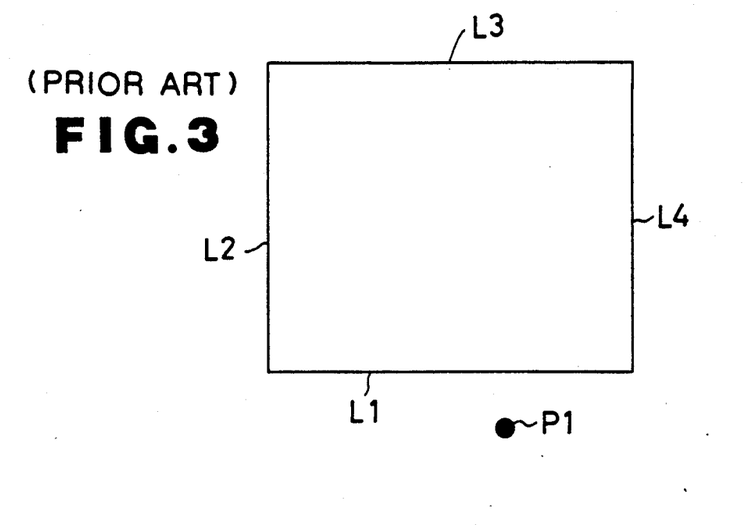
FIG. 3 is a drawing showing machining geometric elements based on FIG. 2.

FIGS. 2(a) to 2(c) are three-view projections showing an example of a shape to be machined and FIG. 3 is a drawing of the elements to be input from the machining geometric element input means, extracted from the three-view projections (FIG. 2) of the example of a shape to be machined. Referring to FIG. 3, P1 denotes the starting point of machining, L1 denotes a segment as a first element of the shape to be machined with a taper angle of 10°, L2 denotes a segment adjoining the segment L1 with a taper angle of 10°, L3 denotes a segment adjoining the segment L2 with a taper angle of 5°, and L4 denotes a segment adjoining the segment L3 with a taper angle of 5°.

Figure 4A:
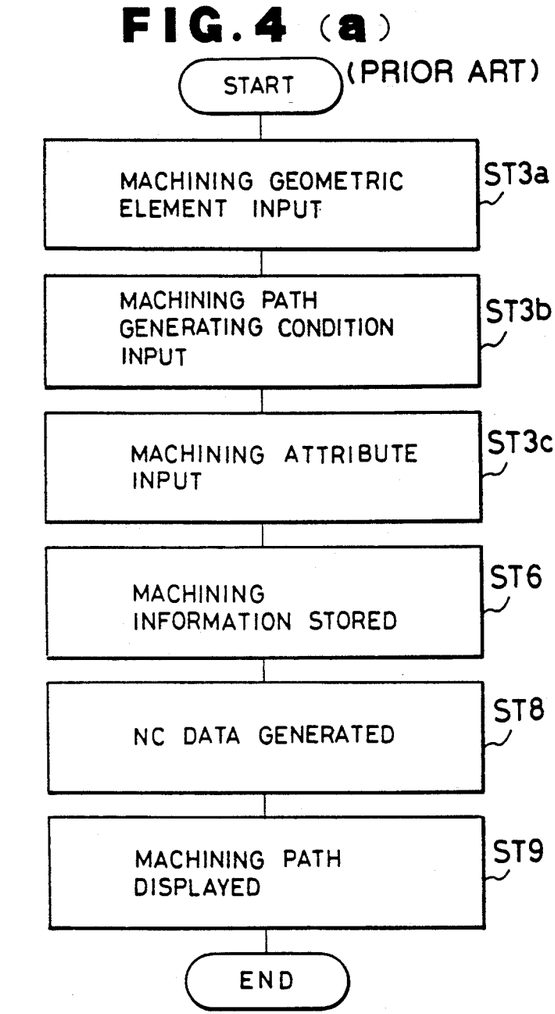
FIG. 4(a), FIG. 4(b), and FIG. 4(c) are respectively a flow chart of operations for generating NC data for the example of machining shown in FIG. 2 performed in the apparatus of FIG. 1, a part program, and a machining path displayed after execution of the part program.
Figure 4B:
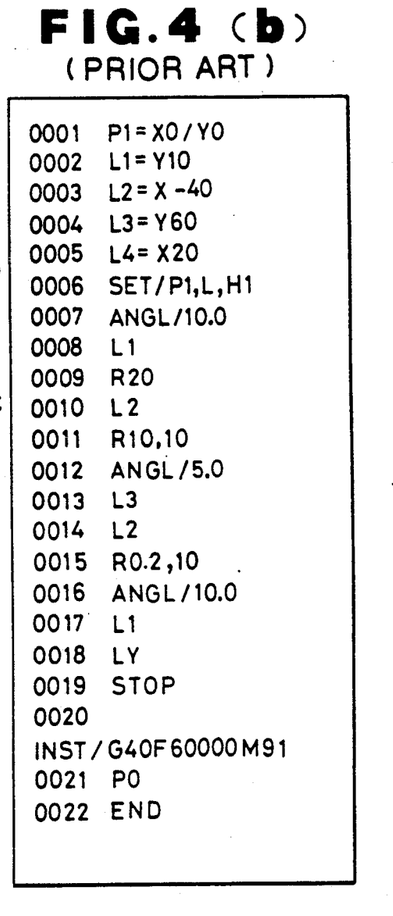
Figure 4C:
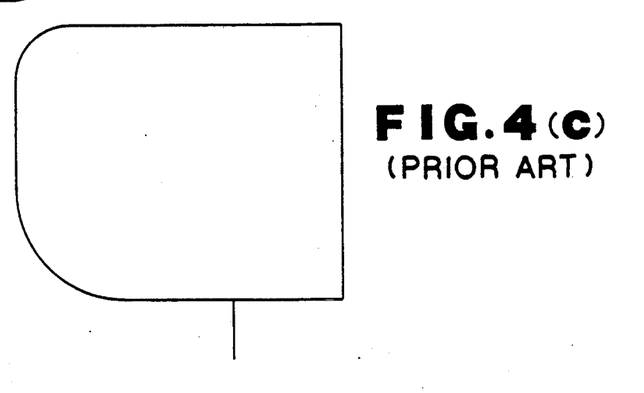

FIGS. 4(a), 4(b), and 4(c) are respectively a flow charts for production of the NC data made out by the user according to FIG. 3, a part program, and a machining path drawn on the display. The Steps ST3a, ST3b, ST3c, ST6, ST8 and ST9 in FIG. 4(a) respectively correspond to the means 3a, 3b, 3c, 6, 8 and 9 shown in FIG. 1.

Operation of the apparatus will be described below with reference to the example of the part program shown in FIG. 4(b). Upon receipt of the machining drawing (FIG. 2, the operator assigns arbitrary names (numerals) to necessary elements in the drawing (P1, L1-L4, in FIG. 3) and defines the information which these elements have in a machining geometric element input step ST3a. This operation corresponds to lines 0001 to 0005. Line number 0001 indicates that X coordinate and Y coordinate of the machining starting point P1 are both 0's. Line number 0002 corresponds to the first machining element of the shape approached from the machining starting point P1 and indicates that it is a segment with Y coordinate being 10, line number 0003 indicates a segment with X coordinate being −40, line number 0004 indicates a segment with Y coordinate being 60, and line 0005 indicates a segment with X coordinate being 20.

Then, definition of the movement and definition of attributes are respectively performed in a machining path generating condition input step ST3b and in a machining attribute input step ST3c. These operations correspond to line number 0006 and onward. Line number 0006 is an instruction for establishment of the coordinate system, specification of the offset direction, and assignment of the offset number, where it is indicated that the current position is set to the coordinate P1, the offset direction is left, and the offset number is 1. Line number 0007, 0012, and 0016 specifies the taper angles, each of which affects the following elements until another taper angle being newly specified. In numerical control apparatuses, in general, the specification for the direction of inclination of the taper is made by giving a minus sign "−" to the value when it is inclined to the left with respect to the advancing direction and by giving a plus sign "+" (this sign can be omitted) when it is inclined to the right. The same rule is applied to the present example. Line numbers 0008, 0010, 0013, 0014, 0017, 0018, and 0021 indicate the paths along which the wire moves by using the names of geometric elements, where PO denotes the origin (0,0) of the coordinate system, and LY denotes the y-axis. Line number 0009 is an instruction that the corner portion between the geometric elements in the paths of movement indicated in the preceding and following steps should be connected with an arc of a specified radius. Each of line numbers 0011 and 0015 is an instruction, in addition to the instruction for the corner arc as described above with reference to line number 0009, of the radius of the corner arc of an auxiliary plane to that corner arc, that is, for corner radii assignment to both upper and lower planes. At this time, the elements in continuance with the corner arc must be segments. The height of the auxiliary plane is set in the numerical control apparatus. Line number 0019 indicates an instruction word for outputting M01 of NC data, line 0020 indicates an instruction word for causing NC data to be directly output, and line 0022 indicates the end of the part program.

Since the prior art CAD/CAM apparatus is constituted as described above, troublesome operations should be performed in entering additional machining attributes for producing NC data. For example, the taper angle must be input in consideration for the direction of the inclination after deciding the advancing direction of the machining. Even if only the advancing direction of the same machining shape is to be changed the definition must be made over again, thus deteriorating the throughput efficiency. Further, there have been problems that it is difficult to confirm the additional information corresponding to the machining attributes, and hence it takes a long time to input data from a keyboard, and in addition complicated instruction words must be learned.

SUMMARY OF THE INVENTION

The present invention was made to overcome the above enumerated problems. Accordingly, it is a major object of the present invention to provide a CAD/CAM apparatus which makes it unnecessary to learn the complicated instruction words, enables entry of all numerical values to be input with positive signs, can display the machining attributes and additional information on the display so as to be visually confirmed and to produce error-free NC data in a shorter time.

In a CAD/CAM apparatus for producing NC data by giving information on a machining geometric shape and machining attribute information thereto, the CAD/CAM apparatus according to the present invention comprises a machining geometric shape input means for inputting a machining geometric shape, a machining geometric shape display means for displaying the input machining geometric shape on a display, a machining attribute specification means for specifying kinds or types of machining attributes, a geometric element selection means for selecting a geometric element to which the machining attributes are to be added, an additional information input means for inputting additional information according to the kinds of the machining attributes, a machining information storage means for storing the input machining attribute information corresponding to the selected geometric element together with the geometric information, a machining attribute information display means for displaying the input machining attribute information in connection with the selected geometric element, an NC data generation means for generating NC data corresponding to the input information on the machining geometric shape and the machining attribute information, and a machining path display means for displaying a machining path.

The above and other objects and features of the present invention will become apparent from the following description with reference to the accompanying drawings.

DETAILED DESCRIPTION OF THE PREFERRED EMBODIMENTS

Figure 5:
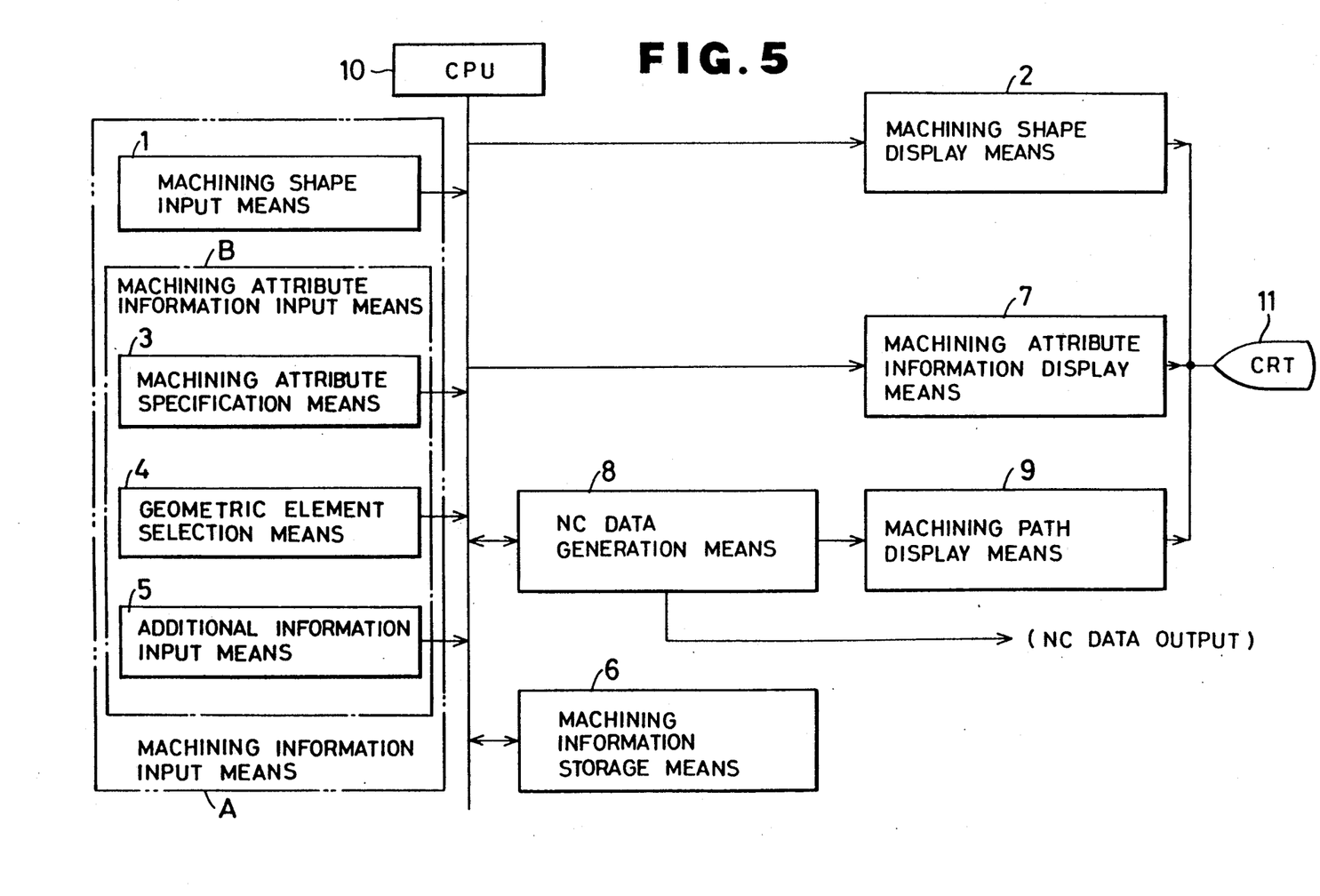
FIG. 5 is a block diagram showing an embodiment of the present invention.

An embodiment of the present invention will be described below with reference to the accompanying drawings FIG. 5 is a block diagram showing an embodiment of the present invention capable of shortening the time for producing NC data by making inputting of machining attributes easy. Referring to the figure, reference numeral 1 denotes a machining geometric shape input means for inputting a machining geometric shape necessary for obtaining movement information, 2 denotes a geometric shape display means for displaying the input machining geometric shape on a display 11, 3 denotes a machining attribute specification means for specifying kinds of machining attributes, 4 denotes a geometric element selection means for selecting a geometric element to which machining attributes are to be added, 5 denotes an additional information input means for inputting information additional to the machining attributes, 6 denotes a machining information storage means for storing the input machining attribute information corresponding to the selected geometric element together with the geometric information, 7 denotes a machining attribute information display means for displaying the input machining attribute information at the position of the selected geometric element, 8 denotes an NC data generation means for generating NC data corresponding to the input information of the machining geometric shape and the machining attribute information, 9 denotes a machining path display means for displaying a machining path, 10 denotes a CPU, 11 denotes a display, A denotes a machining information input means, and B denotes a machining attribute information input means.

Figure 6:
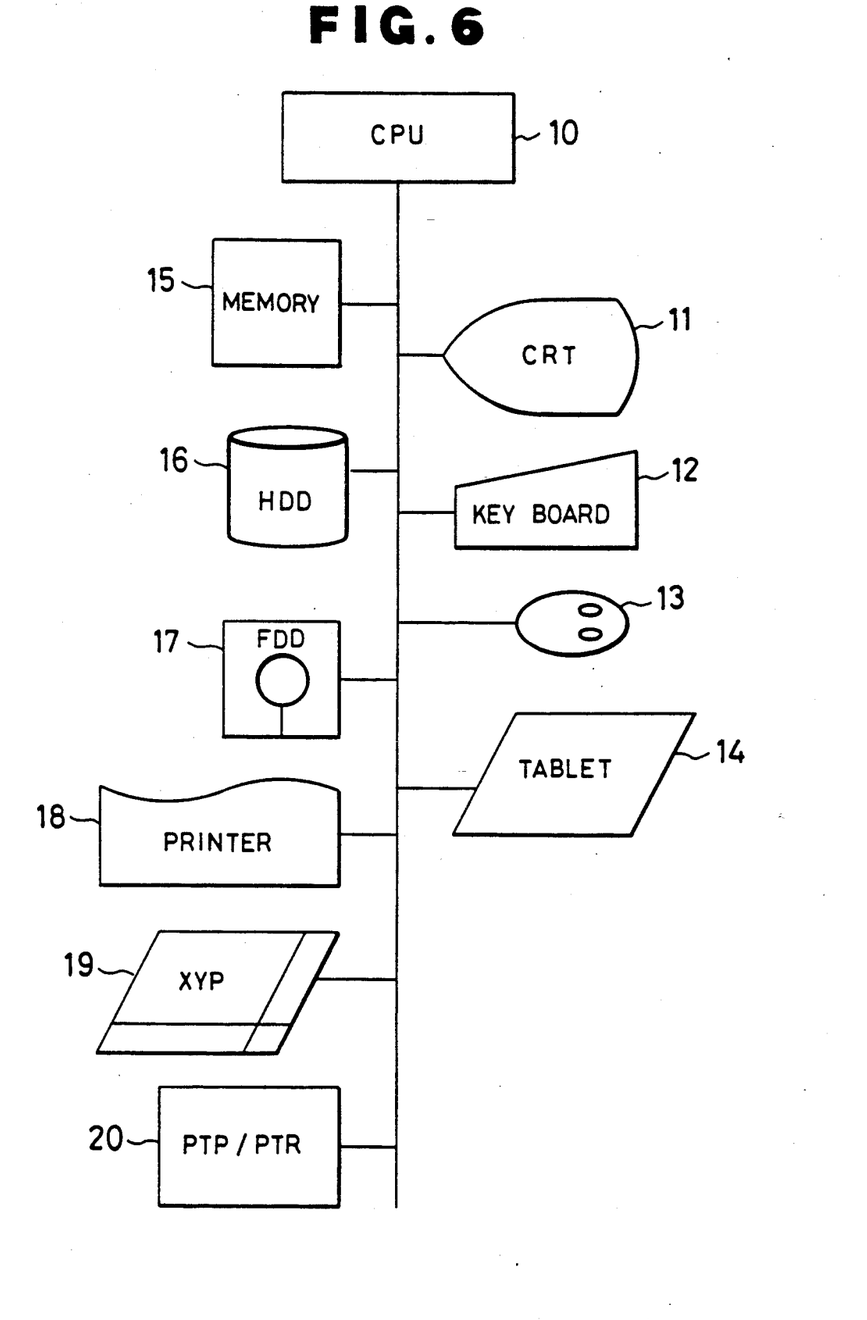
FIG. 6 is a block diagram showing a hardware configuration of the apparatus shown in FIG. 5.

FIG. 6 is a block diagram showing a hardware configuration for achieving the CAD/CAM apparatus shown in FIG. 5, wherein reference numeral 10 denotes a CPU, 11 denotes a CRT, 12 denotes a keyboard, 13 denotes a mouse, 14 denotes a tablet, 15 denotes a memory, 16 denotes a hard disk drive, 17 denotes a floppy disk drive, 18 denotes a printer, 19 denotes an X-Y plotter, and 20 denotes a paper tape reader/puncher.

Figure 7:
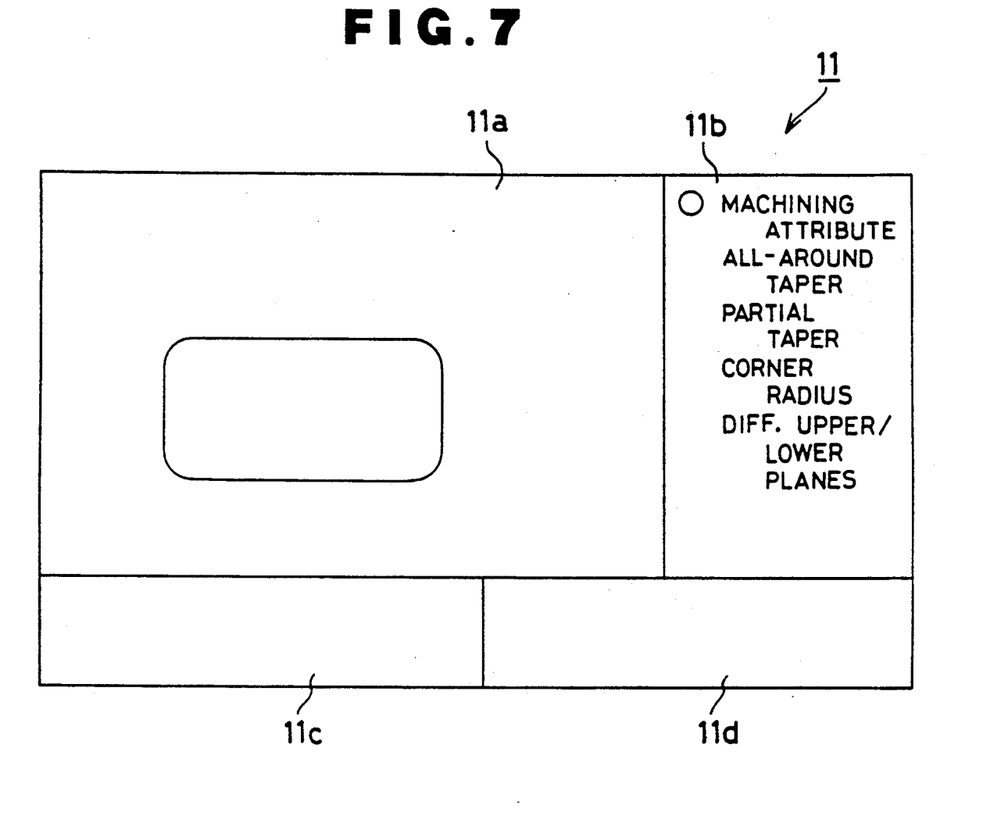
FIG. 7 is an explanatory drawing of a display screen in the apparatus shown in FIG. 5.

FIG. 7 is an explanatory drawing of display regions on the CRT 11 used in the present embodiment, the display regions including a machining geometric shape input region 11a, a menu region 11b, an input item display and additional information input region 11c, and a command status display region 11d.

Operation of the embodiment with the above described arrangement will be described below with reference to the example drawings of machining shown in FIGS. 2(a) to 2(c).

Figure 8:
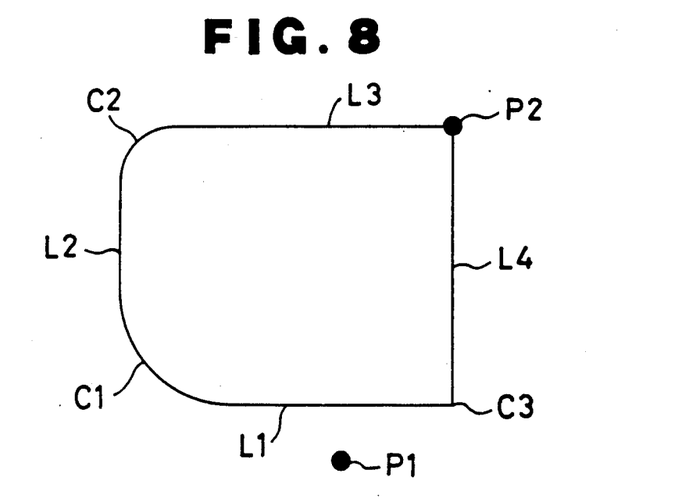
FIG. 8 is a drawing showing machining geometric elements based on the example of machining shown in FIG. 2.

The operator, upon receipt of the drawings of machining as shown in FIGS. 2(a) to 2(c), first, inputs the machining geometric shape necessary for providing movement information as a part of the NC data, i.e., the machining starting point P1, the straight line portions L1 to L4 forming the machining geometric shape, the corner arc portions C1 to C3 located between the straight lines forming the machining geometric shape, and the point P2 having a sharp edge as shown in FIG. 8 by using the machining geometric shape input means 1.

Figure 9:
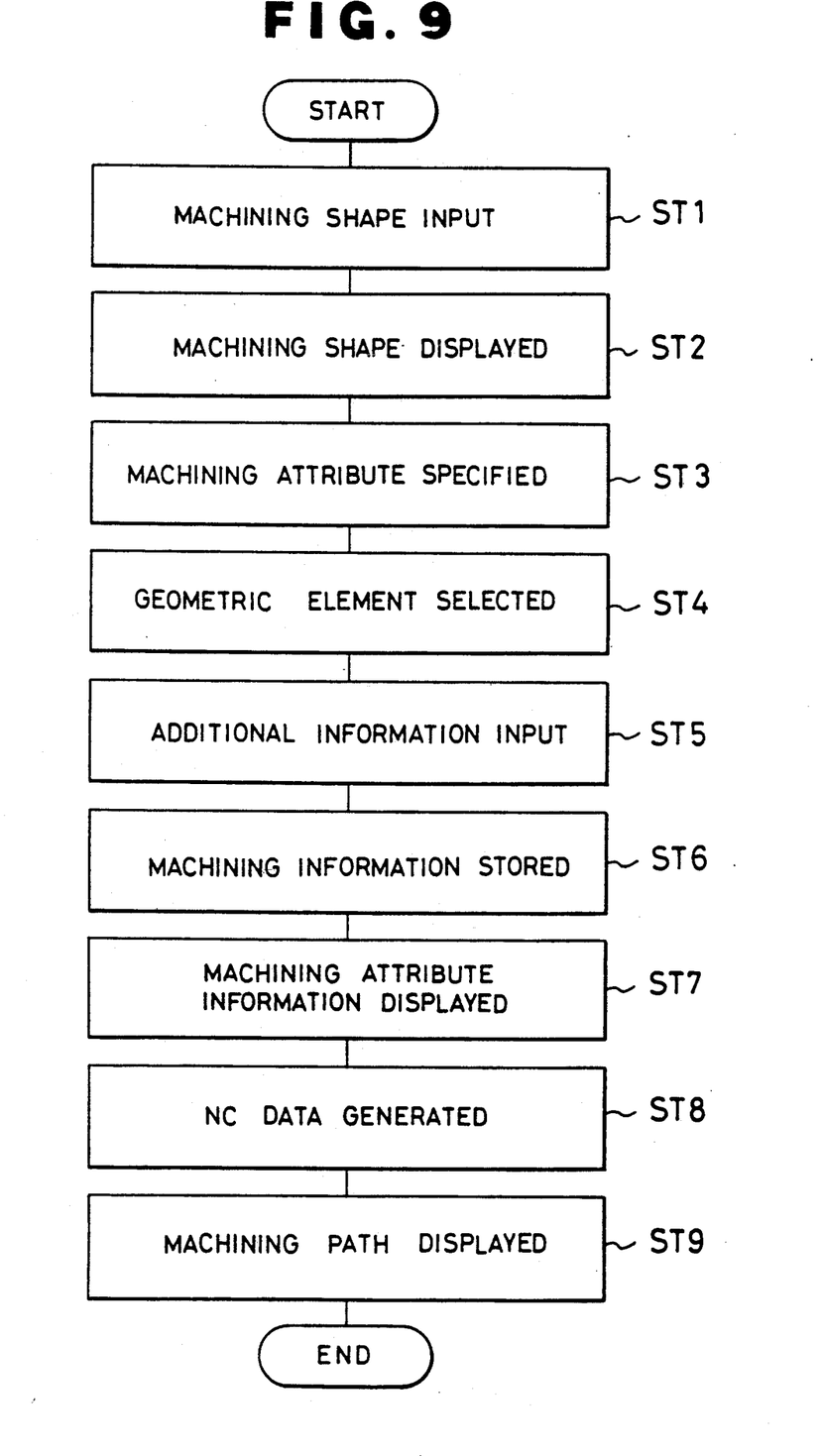
FIG. 9 is a flow chart showing operations of the apparatus shown in FIG. 5.

When the above described inputting of the machining geometric shape (step ST1 in FIG. 9) has been finished, inputting of the machining attribute (step ST3) is performed. First, inputting of the taper attribute will be described with reference to a flow chart of FIG. 10(a). As shown in FIG. 2, L1, C1, and L2 each have an angle of taper of 10°, and L3 and L4 have an angle of taper of 5°. Although each of the taper angles can be also added to the respective geometric elements, in order to save the inputting, there are provided both a means for specifying the taper for entire circumference with a single command/selection and a means for specifying the taper for each element.

First, a command for specifying the taper for entire circumference is selected from the menu region 11b on the CRT 11 shown in FIG. 7 (step Sa1). Then, a message prompting to specify the element is displayed in the input region 11C. Responding to this message, L1 is specified by using an input device such as a mouse 13 (step Sa2). Then, a message prompting to input an angle is displayed in the input region 11c, and responding to this message, a taper angle 10 and "carriage return" are input by using an input device such as a keyboard 12 (step Sa3). Thereupon, an indicator 26a in FIG. 11(a) is displayed.

Then, a message prompting to specify the direction of the lower nozzle is displayed in the input region 11c. To respond to this message, the direction may be specified by using an input device such as a mouse. However, the form shown in FIG. 2 is considered to be widening toward the bottom side, i.e., the lower nozzle is located outside the geometric shape. Hence, in this inputting, an arbitrary position below L1 is designated. By this inputting, an indicator 27 in FIG. 11(a) is displayed. By this operation, an angle of taper of 10° has been provided along the entire circumference. However, since the angle is 5° for L3 and L4, this angle of taper must be provided. The operation to be performed following selection of the command from the menu region 11b for providing the angle of taper for each element is the same as that described above.

Figures 10A, 10B:
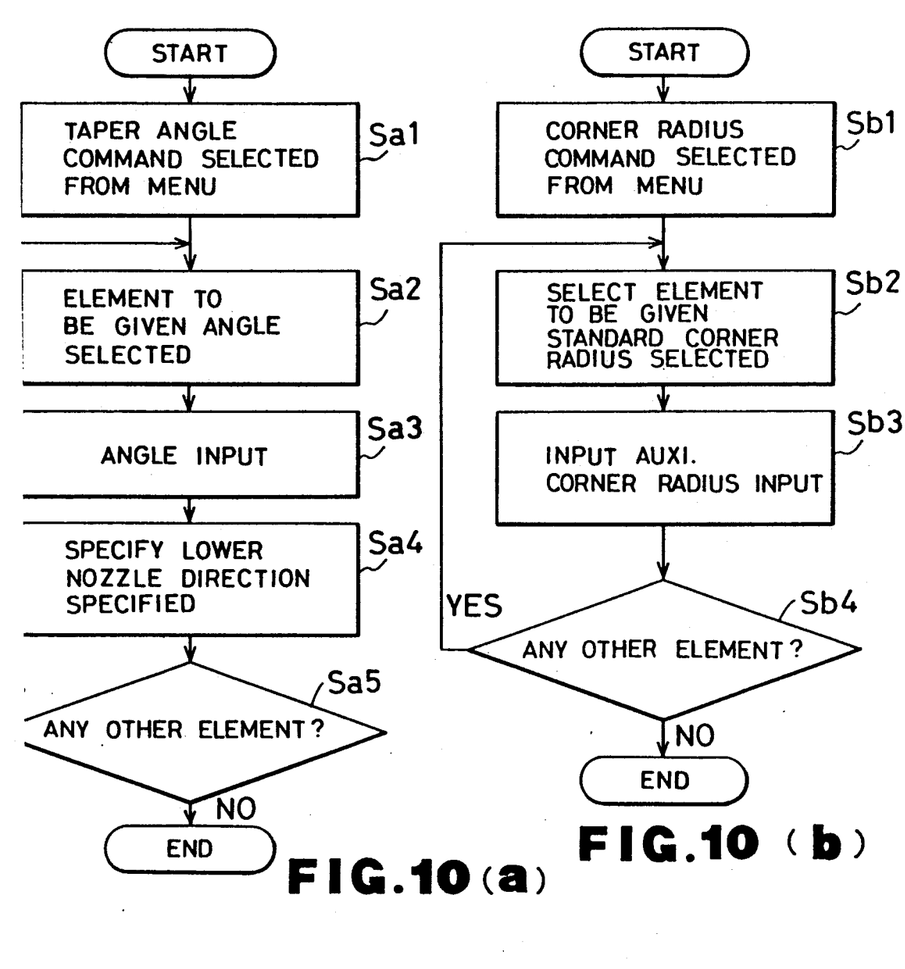
FIG. 10(a), FIG. 10(b), and FIG. 10(c) are respectively flow charts of operations for inputting taper attributes, operations for inputting corner attributes, and operations for inputting attributes for different upper and lower shapes.

Now, inputting of the corner attribute will be described with reference to a flow chart of FIG. 10(b). The corner arc of the auxiliary plane at the corner C1 shown in FIG. 8 is automatically calculated based on the corner arc of the base plane, the distance between the base and auxiliary planes, and the angle of taper at the corner C1. Hence, no specification is required for it. As to the corner C2, however, specification for arcs for both upper and lower planes, which are always constant regardless of the height, is required. Accordingly, first, the attribute providing command for specification of upper and lower corner arcs is selected from the menu region 11b (step Sb1). Then, a message prompting to specify the element is displayed in the input region 11c, and responding to the message, C2 is specified by using an input device such as a mouse (step Sb2). Then, a message prompting to specify the corner arc radius of the auxiliary plane is displayed in the input region 11c. Responding to this message, a numeral 10 as the angle of taper, followed by "carriage return", is input from an input device such as a keyboard (step Sb3). According to this inputting, an indicator 28 in FIG. 11(a) is displayed. Then, the corner attribute of the corner C3 may be provided. At this corner, since the radius of arc is 0.2 at the definition height of the geometric shape of the object and it is changed to 10 at the height of 40 of the auxiliary plane, specifications for both upper and lower corner arcs are required. Accordingly, in succession to the above described specification of C2, a sequence of operations from the selection of the element are repeated. At this time, there is displayed a message prompting to specify an element in the input region 11c.

Figure 11:
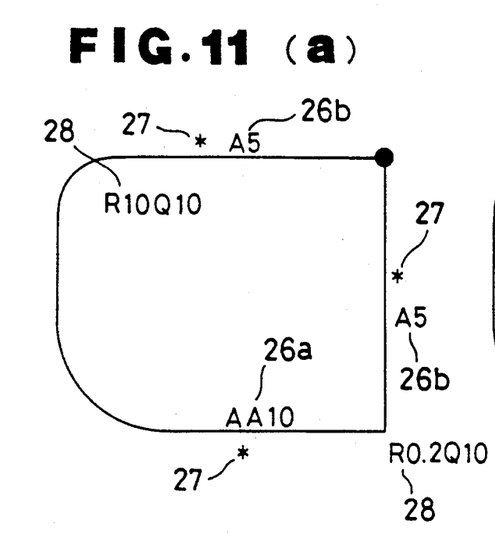
FIG. 11(a) and FIG. 11(b) respectively show a display of machining information after machining attributes have been assigned to the machining geometric elements shown in FIG. 8 and a display of a machining path.
Figure 12:
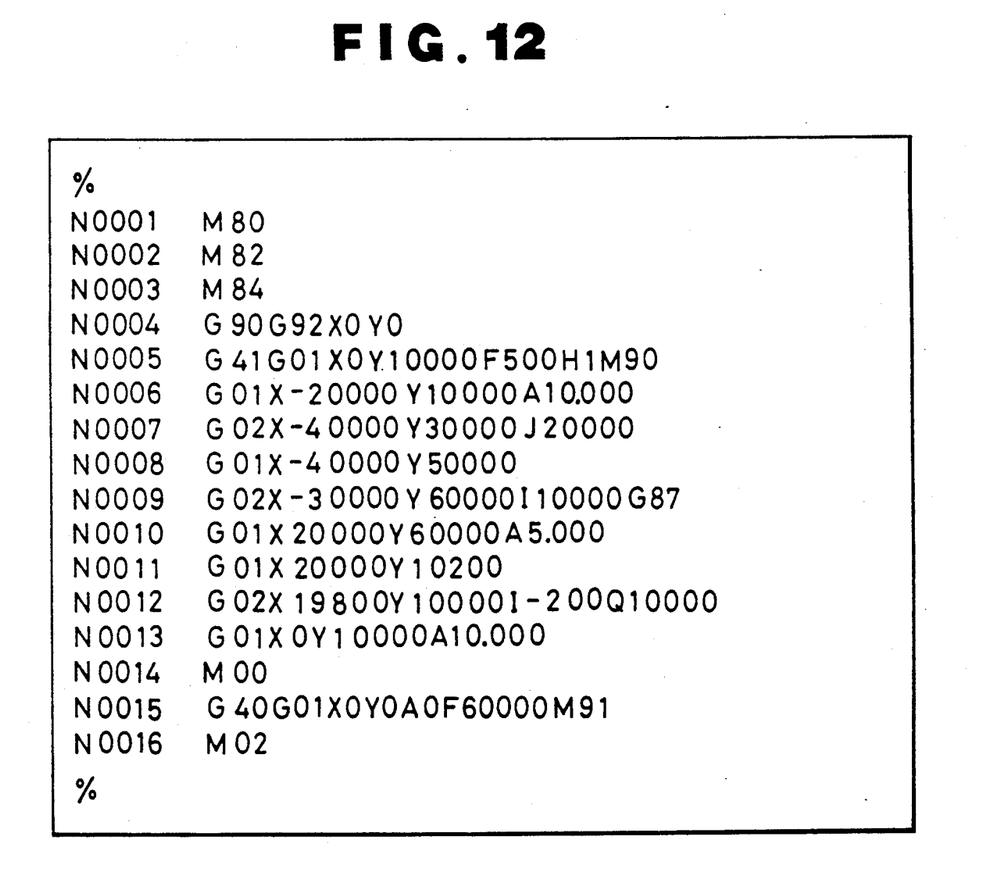
FIG. 12 is an NC data list.

When the operations for providing attributes are finished and NC data are generated by the NC data generation means 8, a machining path as shown in FIG. 11(b) is displayed and NC data as shown in FIG. 12 are stored in the memory 15.

Figure 13:
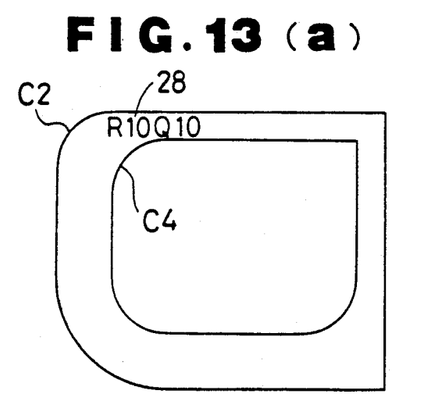
FIG. 13(a), FIG. 13(b), FIG. 13(c), and FIG. 13(d) are respectively a display of corner attribute, a display of attributes for different upper and lower shapes, a display of a machining path corresponding to FIG. 13(b), and a display of attributes for partially different upper and lower shapes.

As to the inputting of additional information to the corner attribute in the above described embodiment, the method to input the corner arc radius of the auxiliary surface directly from a keyboard or the like was described, but the same result can be obtained by having the corner arc (C4) of the auxiliary plane corresponding to the corner arc previously input with the machining geometric shape input means 1 as shown in FIG. 13(a) and by specifying the element corresponding thereto using a mouse or the like.

Figure 10C:
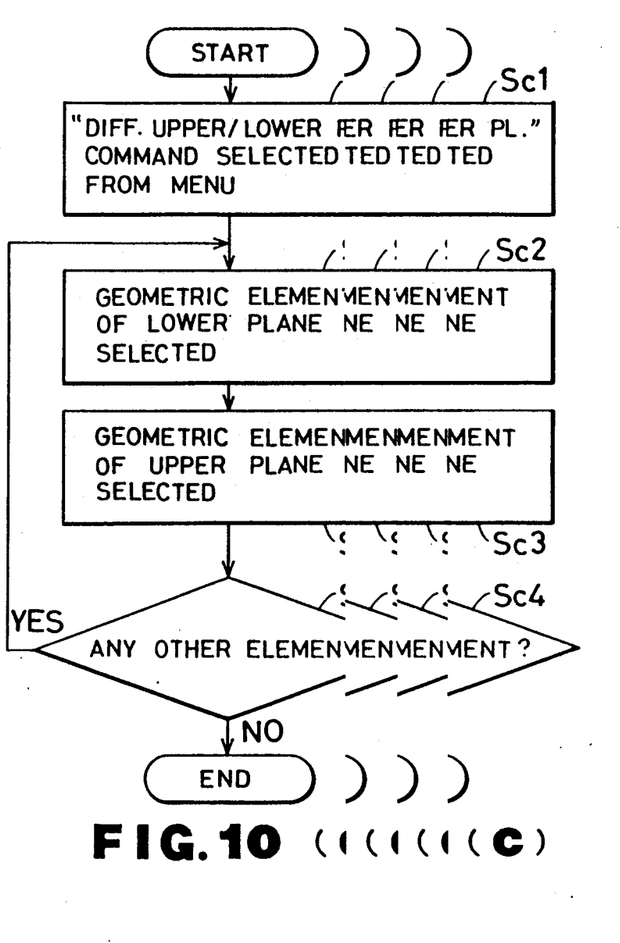

In the above described embodiment, the case was described where the specification of the corner arc attribute and specification of taper angle attribute were used, but, in the example of machining as shown in FIG. 2, the same effect can be obtained by specifying machining for upper and lower shapes, in which the machining shapes for both upper and lower planes are specified. A flow chart for this case corresponding to FIGS. 10(a) and 10(b) is shown in FIG. 10(c). The steps Sc1 to Sc4 in FIG. 10(c) showing the input operation for providing attributes to the different upper and lower shapes respectively correspond to the steps Sa1 and Sb1 for specifying the kind of machining attribute, the steps Sa2 and Sb2 for selecting the element to which the machining attribute is provided, the steps Sa3 and Sa4 and Sb3 for inputting additional information, and the steps Sa5 and Sb4 for detecting whether or not there is any element to which the same machining attribute is to be provided, in FIG. 10(a) showing the taper attribute inputting process and in FIG. 10(b) showing the corner attribute inputting process.

FIG. 13(b) shows the machining geometric shape at that time. Referring to this figure, L1 is an element indicating that the shape is that of the lower plane and L5 is that indicating that the shape is that of the upper plane. Further, 29 is an attribute display indicating that the shape is that of the lower plane and 30 is an attribute display indicating that the shape is that of the upper plane. FIG. 13(c) is an example of a display of the machining path in the present example. In the aforesaid example for machining of different upper and lower shapes, there was no element common for both the upper and lower plane, but even if there is a common element such as L18 or L19 shown in FIG. 13(d), the method for specification can be the same. Further, in the specification of the elements of the upper and lower planes, the corresponding elements need not always be specified as such, as shown in the figure.

As to the hardware in the above described embodiment, an NC apparatus directly outputting control commands to the driving unit of an NC processing machine may be substituted for the paper tape reader/puncher 20 shown in FIG. 6.

The present invention can also be embodied in the arrangements as follows comprising their respective means in each arrangement.

(1) A CAD/CAM apparatus, wherein means for inputting taper angles as machining attributes comprises means for specifying a taper angle for each geometric element separately, means for specifying a taper angle along an entire circumference when a geometric shape as a machining unit has all its endpoints continued and all the geometric elements have the same taper angle, and means for specifying the direction of inclination of its wire by using a mouse or the like.

(2) A CAD/CAM apparatus, wherein additional information input means for specifying and inputting corner R's of upper and lower planes as machining attributes at a corner between two geometric elements separately and independently of taper angles, comprises means for inputting the value of the corner R of the auxiliary plane directly with a numerical value and means for specifying a corresponding geometric element by an input device.

(3) A CAD/CAM apparatus, wherein geometric element selection means for inputting different upper and lower shapes as machining attributes when machining shapes are different between the upper and lower planes comprises means for specifying the machining shapes different between the lower and upper planes by specifying at least one each of geometric elements, which are arbitrarily chosen from geometric elements forming the shapes of the lower and upper planes, when these geometric elements do not include any geometric element in common, and means for specifying the machining shapes different between the lower and upper planes by specifying at least one each of corresponding geometric elements, which are arbitrarily chosen from the uncommon geometric elements which form the shapes of the lower and upper planes being continuous by holding an endpoint of one geometric element in common with that of another geometric element, when the geometric elements have a geometric element in common.

(4) A CAD/CAM apparatus, wherein the machining geometric shape input means comprises means for producing a point at a connected portion of two geometric elements without a corner radius, and the NC data generation means comprises means for generating NC data of a corner radius which inserts a corner arc when no point is displayed and means for generating NC data of a sharp edge which does not insert a corner arc when the point is displayed at the connected portion.

(5) A CAD/CAM apparatus, wherein, in case of a geometric shape forming a continuous unit of machining where any one of geometric elements has one endpoint in common with another, inputting of the aforesaid taper angle, corner R's specification for both upper and lower planes, specification for different upper and lower planes, and corner processing instructions are performed in a mixed way.

According to the present invention, as described in the foregoing, a series of means (a machining attribute specification means, a geometric element selection means, and an additional information input means) enables machining attributes to be input in an interactive manner while those data are displayed on a display, whereby inputting of the machining shape and machining attributes can be performed simply, and since all the information is displayed, confirmation thereof can be made easy. Thus, such effect can be obtained that the time required for generating NC data is shortened and the machining work can be performed with high accuracy.

What is claimed is:

1. A CAD/CAM apparatus in which an operator enters information identifying a machining geometric shape formed from a plurality of geometric elements and information identifying machining attributes corresponding to said geometric elements, said apparatus generating NC data based on said shape and attribute information, comprising:

geometric shape input means for inputting the machining geometric shape;

geometric shape display means for displaying the machining geometric shape;

attribute type specification means for specifying a machining attribute type;

element selection means for selecting a geometric element from said plurality of geometric elements that corresponds to the specified machining attribute type;

attribute value input means for entering values for the specified machining attribute type, wherein said attribute value is automatically assigned to said selected element and at least one other element, said attribute value input means determining how many elements besides the selected element are assigned said attribute value based on the attribute type, said attribute value input means comprising:
means for separately specifying a taper angle for each geometric element, and
means for specifying a taper angle along an entire circumference of the machining geometric shape with a single input command from said operator, by assigning said entered attribute value to each element from said plurality of elements connected to said selected element when an all-around taper attribute is selected, and
means for specifying a direction of wire inclination by using a mouse;

information storage means for storing the entered attribute type and value information associated with a corresponding geometric element and the geometric shape information;

attribute information display means for displaying the entered attribute type and value information at a position of the selected geometric element;

NC data generation means for generating NC data corresponding to the entered geometric shape and attribute information; and machining path display means for displaying a machining path corresponding to the generated NC data.

2. A CAD/CAM apparatus according to claim 1, wherein
said geometric shape includes base and auxiliary planes defined by said elements and said elements include straight line portions with corner arcs therebetween, whereby attribute values for corner arcs constitute radii, said attribute value input means further comprising:
means for inputting a value of a first corner radius of the base plane directly with a numerical value, and
means for specifying a corner arc corresponding to said first corner radius by using a mouse, said attribute input means automatically calculating and assigning a second corner radius to a corresponding second corner arc of said auxiliary plane based on said first corner radius and a taper angle.

3. A CAD/CAM apparatus according to claim 1, wherein
said geometric shape input means includes means for generating a point at a connected portion of two geometric elements of the geometric shape displayed on the geometric shape display means in case of the connected portion being a sharp edge, and said NC data generation means includes means for generating NC data of the sharp edge which does not insert a corner arc into the connected portion of said geometric elements given said point, and means for generating NC data of a corner radius which inserts a corner arc into the connected portion of said geometric elements not given said point.

4. A CAD/CAM apparatus according to claim 3, wherein said geometric shape input means includes a mouse.

5. A CAD/CAM apparatus according to claim 1, wherein said input means includes a mouse.

6. A CAD/CAM apparatus according to claim 1, wherein said specifying means includes said mouse.

7. A CAD/CAM apparatus in which an operator enters information identifying a machining geometric shape formed from a plurality of geometric elements and information identifying machining attributes corresponding to said geometric elements, said geometric shape including base and auxiliary planes defined by said elements, said elements including straight line portions with corner arcs therebetween, and said apparatus generating NC data based on said shape and attribute information, comprising:

geometric shape input means for inputting the machining geometric shape;

geometric shape display means for displaying the machining geometric shape;

attribute type specification means for specifying a machining attribute type;

element selection means for selecting a geometric element from said plurality of geometric elements that corresponds to the specified machining attribute type;

attribute value input means for entering values for the specified machining attribute type, wherein said attribute value is automatically assigned to said selected element and at least one other element, said attribute value input means determining how many elements besides the selected element are assigned said attribute value based on the attribute type, said attribute value input means further comprising:

means for inputting a value of a first corner radius of the base plane directly with a numerical value, and means for specifying a corner arc corresponding to said first corner radius by using a mouse, said attribute input means automatically calculating and assigning a second corner radius to a corresponding second corner arc of said auxiliary plane based on said first corner radius and a taper angle, whereby attribute values for corner arcs constitute radii;

information storage means for storing the entered attribute type and value information associated with a corresponding geometric element and the geometric shape information;

attribute information display means for displaying the entered attribute type and value information at a position of the selected geometric element;

NC data generation means for generating NC data corresponding to the entered geometric shape and attribute information; and machining path display means for displaying a machining path corresponding to the generated NC data.

8. A CAD/CAM apparatus in which an operator enters information identifying a machining geometric shape formed from a plurality of geometric elements and information identifying machining attributes corresponding to said geometric elements, said apparatus generating NC data based on said shape and attribute information, comprising:

geometric shape input means for inputting the machining geometric shape;

geometric shape display means for displaying the machining geometric shape;

attribute type specification means for specifying a machining attribute type;

element selection means for selecting a geometric element from said plurality of geometric elements that corresponds to the specified machining attribute type;

attribute value input means for entering values for the specified machining attribute type, wherein said attribute value is automatically assigned to said selected element and at least one other element, said attribute value input means determining how many elements besides the selected element are assigned said attribute value based on the attribute type, such that, when inputting machining attributes of a geometric shape, which is formed out of geometric elements continuously connected to one another by holding an endpoint of the one geometric element in common with that of another, the following instructions are performed in any sequence: taper angle inputting, corner R's specification for both upper and lower planes, specification for different upper and lower planes, and corner processing instructions;

information storage means for storing the entered attribute type and value information associated with a corresponding geometric element and the geometric shape information;

attribute information display means for displaying the entered attribute type and value information at a position of the selected geometric element;

NC data generation means for generating NC data corresponding to the entered geometric shape and attribute information; and machining path display means for displaying a machining path corresponding to the generated NC data.

9. A CAD/CAM apparatus according to claim 8, wherein said geometric element selection means includes a mouse.

10. A CAD/CAM apparatus in which an operator enters information identifying a machining geometric shape formed from a plurality of geometric elements and information identifying machining attributes corresponding to said geometric elements, said apparatus generating NC data based on said shape and attribute information, said geometric shape includes upper and lower planes having different shapes, said upper and lower shapes being formed from first and second groups of elements, respectively, comprising:

geometric shape input means for inputting the machining geometric shape;

geometric shape display means for displaying the machining geometric shape;

attribute type specification means for specifying a machining attribute type;

element selection means for selecting a geometric element from said plurality of geometric elements that corresponds to the specified machining attribute type;

attribute value input means for entering values for the specified machining attribute type, wherein said attribute value is automatically assigned to said selected element and at least one other element, said attribute value input means determining how many elements besides the selected element are assigned said attribute value based on the attribute type;

information storage means for storing the entered attribute type and value information associated with a corresponding geometric element and the geometric shape information;

attribute information display means for displaying the entered attribute type and value information at a position of the selected geometric element;

NC data generation means for generating NC data corresponding to the entered geometric shape and attribute information; and machining path display means for displaying a machining path corresponding to the generated NC data, said element selection means comprising:

first means for separately specifying each element in the upper and lower shapes, when the first and second groups contain no common elements, by separately assigning each geometric element and second means for specifying different elements in the upper and lower shapes, when the first and second groups contain some common elements, by selecting different attribute types and different elements for said upper and lower planes, said second means automatically forming and attaching coordinate information to said specified element by tracing said specified element from a first endpoint to a second endpoint, said second endpoint being in contact with an endpoint of an element common to the upper and lower planes.

* * * * *